United States Patent
Gierer et al.

(10) Patent No.: US 6,705,594 B1
(45) Date of Patent: Mar. 16, 2004

(54) SEAL FOR INTERMEDIATE SHEET STEEL OF A VALVE HOUSING FOR AN AUTOMATIC TRANSMISSION

(75) Inventors: Georg Gierer, Kressbronn (DE); Herbert Kiebler, Tettnang (DE); Hubert Friedrich, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 106 days.

(21) Appl. No.: 10/089,376

(22) PCT Filed: Sep. 30, 2000

(86) PCT No.: PCT/EP00/09619
§ 371 (c)(1),
(2), (4) Date: Mar. 28, 2002

(87) PCT Pub. No.: WO01/25655
PCT Pub. Date: Apr. 12, 2001

(30) Foreign Application Priority Data

Oct. 6, 1999 (DE) .......................................... 199 47 948

(51) Int. Cl.$^7$ ................................................ F16J 15/12
(52) U.S. Cl. ...................................... 251/368; 74/606 R
(58) Field of Search ........................ 251/368; 74/606 R

(56) References Cited

U.S. PATENT DOCUMENTS

| | | | |
|---|---|---|---|
| 3,679,218 A | 7/1972 | Farnam | 277/233 |
| 4,880,669 A | 11/1989 | Dorn et al. | 427/210 |
| 5,852,957 A | * 12/1998 | Saito | 74/606 R |

FOREIGN PATENT DOCUMENTS

| | | | | |
|---|---|---|---|---|
| DE | 40 41 253 A1 | 6/1992 | ........... | B60K/17/60 |
| DE | 695 09 746 T2 | 12/1995 | ........... | F16H/57/00 |
| DE | 196 21 261 A1 | 11/1997 | ........... | F16J/15/12 |
| DE | 197 15 609 A1 | 11/1998 | ........... | F16J/15/06 |
| EP | 0 733 833 A1 | 9/1996 | ........... | F16H/57/00 |

* cited by examiner

Primary Examiner—Paul J. Hirsch
(74) Attorney, Agent, or Firm—Davis & Bujold, PLLC

(57) ABSTRACT

The hydraulic control device for accommodating electromagnetic actuators and hydraulic valves, which is inserted in an automatic transmission for a motor vehicle, has at least one seal which is made of an aluminum support which has a thickness in the range of from 1 to 2 mm and is coated with a material at least on one side; the material, having a layer thickness in the range of from 100 to 180 $\mu$m, has a hardness in the range of from 20 to 120 Shore A and on its free surface is provided with a profiling having a depth in the range of from 20 to 50 $\mu$m.

8 Claims, 1 Drawing Sheet

SEAL FOR INTERMEDIATE SHEET STEEL OF A VALVE HOUSING FOR AN AUTOMATIC TRANSMISSION

FIELD OF THE INVENTION

The invention concerns a hydraulic control device for accommodating electromagnetic actuators and hydraulic valves which is inserted in an automatic transmission for a motor vehicle and has a valve housing, a control plate, at least one seal and a duct plate.

BACKGROUND OF THE INVENTION

A hydraulic control device of that kind is used both for continuously variable automatic transmissions (CVT) and for stepped automatic transmissions. Electrohydraulic stepped automatic transmissions usually have a starting unit, for example, in the form of a hydrodynamic converter, clutches and brakes, the hydraulic control device and an electronic transmission control unit. The electronic transmission control unit forms from input variables the parameters required for control of the automatic transmission. Input variables are here the signals prepared by sensors, the same as signals made available by other electronic control units such as the motor control unit. The electronic control unit controls via output signals the electromagnetic actuators contained in the hydraulic control device. Shifts are initiated, via the electromagnetic actuators, by selecting an adequate clutch/brake combination. In addition, the pressure course over the hydraulic valves during the shift is controlled, via the electromagnetic actuators, the same as the pressure level outside the shift.

DE A 40 41 253 has disclosed an automatic transmission where the hydraulic control device is situated upon the underside. The hydraulic control device consists of an air intake, a valve housing, a control plate with a seal and a duct plate. The duct plate and the transmission housing come to abut with each other via two faces, said faces being designed as sealing faces. To caulk the hydraulic control device against the transmission housing, seals are required as otherwise the setting behavior and the change of the prestressing force of the connecting screws can cause leakages to appear in this place. The control plate existing between the valve housing and the duct plate also has to be provided with a seal.

The materials usually employed for such hydraulic devices as seals consist of soft substances and are disposed upon steel plates as supports. The seals are stressed by different thermal expansions of control plate and valve housing; in the seals known already, only a one-side caulking could be obtained due to the setting rates. Therefore, selected shorter screw spacings was needed for a better caulking, but this increased the construction cost.

An increase of the prestress forces in the seal joints by placing reinforcing seams also is not possible due to the expensive geometry of the seals needed. The same applies to an improvement of the caulking by means of silicon beads.

The problem on which this invention is based is to provide a hydraulic control device which ensures an excellent caulking specially on the control plates in the hydraulic control device the same as on the sealing faces between hydraulic control device and transmission housing.

SUMMARY OF THE INVENTION

It is proposed, according to the invention, that the seal consist of an aluminum support having a thickness of from 1 to 2 mm and which at least on one side is coated with a material having a layer thickness in the range of from 60 to 180 μm, a hardness in the range of from 20 to 120 Shore A and which, on its free surface, is provided with a profiling having a profile depth of from 20 to 50 μm, In one development of the invention, it is proposed to produce the profile depth of the surface of from 20 to 50 μm by a foaming process.

With the inventively developed seal, an excellent caulking is obtained both on the control plates in the hydraulic control device and on the sealing faces between hydraulic control device and transmission housing. This sealing effect can be obtained by the profiling of the surface with less pressing forces than was formerly customary. By the selection of the thickness of the coating, of the profiling of the coating and by the selection of the hardness of the material, which is an elastomer, the sealing effect can be exactly adapted to the surfaces of the opposing faces.

By selecting the support material in the form of aluminum, the seal is adapted both to the control plate and to the thermal expansion of the sealing faces of the housing. Owing to small setting rates, both sides of the support can be coated; the assembly expense is reduced by a preassembled gasket system completed seals: different thermal expansions have no damaging effect upon the seal.

BRIEF DESCRIPTION OF THE DRAWING

The invention is explained in detail herebelow with reference to the drawing where an advantageous embodiment is shown. In the drawing.

DETAILED DESCRIPTION OF THE INVENTION

As support material for the seal is preferably used aluminum having a thickness in the range of from 1 to 2 mm and preferably of 1.5 mm. At least one side, preferably both sides, of said aluminum support are now coated with a material, preferably an elastomer of bonded fiber-reinforced material consisting, for example, of NBR, the layer thickness of which is in the range of from 100 to 180 μm and preferably amounts to 140 μm. The hardness of this elastomer is in the range of from 20 to 120 Shore A and preferably 70 Shore A.

Figure 1A:
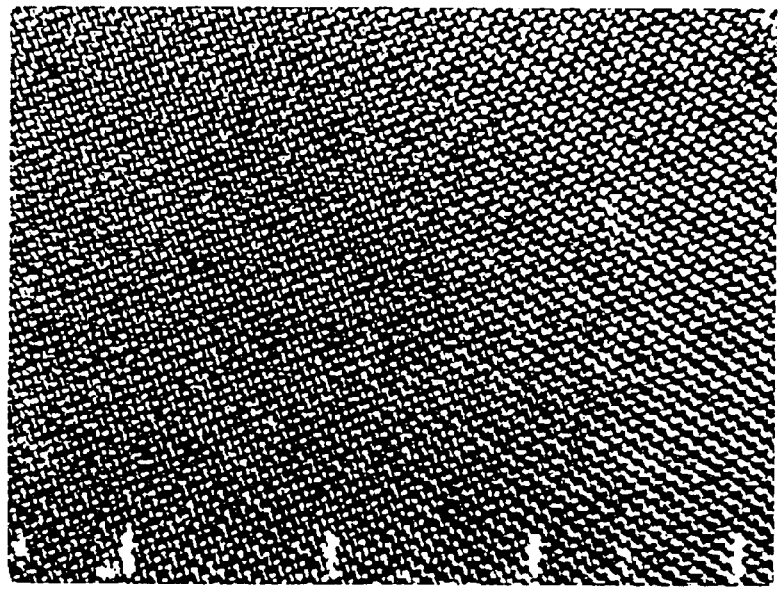
FIG. 1a is a topview on the profiled surface of a seal six times enlarged.
Figure 1B:
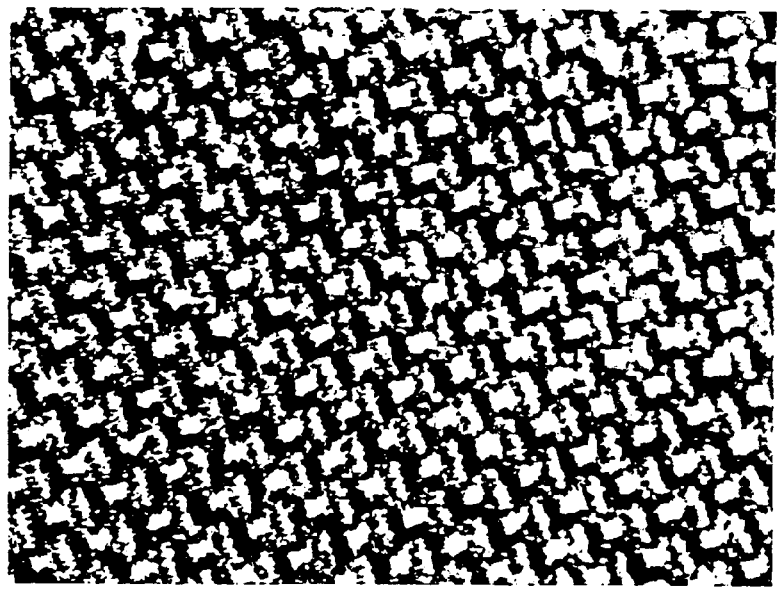
FIG. 1b is said topview twenty-five times enlarged.

The free surface of this material is now provided with a profiling, for example, of the kind of a textile, as shown in FIGS. 1 and 2. Said profiling has a depth in the range of from 20 to 50 μm and preferably of from 35 μm to 40 μm. The supporting portion tip thereby reaches about 50% in a depth of from 15 μm to 20 μm.

Instead of aluminum another light metal can also be used as support.

What is claimed is:

1. A hydraulic control device, for accommodating electromagnetic actuators and hydraulic valves which is inserted in an automatic transmission for a motor vehicle and has a valve housing, a control plate, at least one seal and a duct plate, wherein said seal consists of an aluminum support, having a thickness in the range of from about 1 to about 2 mm, coated at least on one side with a material, which has a layer thickness in the range of from about 60 to about 180 μm, and a hardness in the range of from about 20 to about 120 Shore A and wherein a free surface of the material has a profiling with a profile depth in the range of from about 20 to about 50 μm.

2. The hydraulic control device according to claim 1, wherein said aluminum support has a thickness of about 1.5 mm.

3. The hydraulic control device according to claim 1, wherein the layer thickness of the material upon said aluminum support is about 140 μm.

4. The hydraulic control device according to claim 1, wherein the hardness of the material placed upon said aluminum support is about 70 Shore A.

5. The hydraulic control device according to claim 1, wherein the profile depth of the material placed upon said aluminum support is from about 35 μm to about 40 μm.

6. The hydraulic control device according to claim 1, wherein the material placed upon said aluminum support is an elastomer.

7. The hydraulic control device according to claim 1, wherein the material placed upon said aluminum support is foamed.

8. The hydraulic control device according to claim 1, wherein the material placed upon said aluminum is applied to the aluminum by means of screen printing technology.

* * * * *